US010572566B2

(12) United States Patent
Ni et al.

(10) Patent No.: US 10,572,566 B2
(45) Date of Patent: Feb. 25, 2020

(54) IMAGE QUALITY INDEPENDENT SEARCHING OF SCREENSHOTS OF WEB CONTENT

(71) Applicant: VMware, Inc., Palo Alto, CA (US)

(72) Inventors: Daniel Ni, Beijing (CN); Lucy Shang, Los Altos, CA (US); Zhenjun Zhuo, Beijing (CN); Zohar Hirshfeld, Campbell, CA (US); Jim Peng, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 14 days.

(21) Appl. No.: 16/041,953

(22) Filed: Jul. 23, 2018

(65) Prior Publication Data

US 2020/0026802 A1 Jan. 23, 2020

(51) Int. Cl.
*G06F 16/957* (2019.01)
*G06K 9/00* (2006.01)
*G06F 16/958* (2019.01)

(52) U.S. Cl.
CPC ........ *G06F 16/9577* (2019.01); *G06F 16/986* (2019.01); *G06K 9/00456* (2013.01)

(58) Field of Classification Search
CPC ......................... G06K 9/00469; G06K 16/434
See application file for complete search history.

(56) References Cited

U.S. PATENT DOCUMENTS

| | | | | |
|---|---|---|---|---|
| 8,929,667 | B1 * | 1/2015 | Yuhan | G06F 17/2247 382/218 |
| 9,396,259 | B1 * | 7/2016 | Yuhan | G06F 16/95 |
| 9,582,482 | B1 * | 2/2017 | Sharifi | G06F 16/156 |
| 9,870,623 | B2 * | 1/2018 | Roblek | G06T 7/30 |
| 2002/0161794 | A1 * | 10/2002 | Dutta | G06F 16/957 715/205 |
| 2008/0201326 | A1 * | 8/2008 | Cotter | G06F 16/951 |
| 2010/0211865 | A1 * | 8/2010 | Fanning | G06F 16/9577 715/234 |
| 2010/0211893 | A1 * | 8/2010 | Fanning | G06F 16/958 715/760 |
| 2014/0136944 | A1 * | 5/2014 | Harris | G06F 17/211 715/234 |

(Continued)

*Primary Examiner* — Asher D Kells
(74) *Attorney, Agent, or Firm* — Clayton, McKay & Bailey, PC

(57) ABSTRACT

A system can capture screenshots of web content, and HTML sources for the web content when respective screenshots are captured. Document Object Model (DOM) information can be extracted from each HTML source and provided in a respective DOM extraction file (DEF) associated with each screenshot. The system can receive a keyword and search a repository including each screenshot and DEF combination, find the keyword in select DEFs, and identify select screenshots corresponding to the select DEFs with the keyword. Identifying marks can be added to the select screenshots in locations according to absolute coordinates for nodes corresponding to items in the select DEFs that include the keyword. A list of the select screenshots with identifying marks can be displayed for selection. The system can perform accurate searches of web screenshots independent of image quality and assist build and quality control processes for delivering web-content offerings.

20 Claims, 8 Drawing Sheets

(56) References Cited

U.S. PATENT DOCUMENTS

| | | | | |
|---|---|---|---|---|
| 2015/0278180 | A1* | 10/2015 | Nicholas, Jr. | G06F 17/241<br>715/230 |
| 2015/0278182 | A1* | 10/2015 | Nicholas | G06F 17/241<br>705/80 |
| 2016/0171106 | A1* | 6/2016 | Song | G06F 16/951<br>707/709 |
| 2016/0283073 | A1* | 9/2016 | Fu | G06F 16/148 |
| 2016/0283083 | A1* | 9/2016 | Fu | G06F 9/451 |
| 2016/0299988 | A1* | 10/2016 | Pancharathi | G06F 16/986 |
| 2017/0109159 | A1* | 4/2017 | Archer | G06F 8/73 |
| 2018/0107580 | A1* | 4/2018 | Zhang | G06F 11/3604 |
| 2018/0307746 | A1* | 10/2018 | Du | G06F 17/277 |

* cited by examiner

IMAGE QUALITY INDEPENDENT SEARCHING OF SCREENSHOTS OF WEB CONTENT

BACKGROUND

Web content (e.g., webpages) is developed and utilized to provide websites and applications that are available for public and private consumption. In addition, various types of web content are developed and implemented in customized programmatic platforms utilized by members of organizations (e.g. businesses or government agencies) for communication, information exchange, administration, and productivity. Further, most software products available for purchase by individuals or organizations include some web-based content that provides significant functional components of the software. Many of these websites, applications, platforms, and software products ("web-content offerings") incorporate a user interface ("UI") that includes pages with a mixture of text and multi-media such as images, videos, and audio files.

Development of the web-content offerings and respective UI can involve multiple iterations of web page testing to ensure intended content presents and implements consistently across different browsers, operating systems, and devices. Web page testing can include various types of visual and manual regressions, browser automations, and web page comparisons that require analyzing large numbers of screen shots of the various pages. An objective for development teams using one or more of these methods is to ensure the right text, embedded between various multi-media content, and any additional content appears within the web pages correctly and in correct respective locations.

Analysis of the screenshots, from a text standpoint, may require a search of the text in each screenshot corresponding to a web page of a web-content offering. Further, members of a development team may need to text search different parts of the web pages for different reasons. For example, a quality engineer may need to verify that expected texts for titles, captions, or labels display correctly on a multitude of web pages. At early stages of a development cycle, it is not possible to determine if the expected content is displayed correctly on a large number of web pages using the naked eye, and automated test cases are not normally available for verification purposes at this stage. The screenshot analysis therefore is tedious in current systems.

In another example, technical writers may need to search text in web screenshots to compare against a latest version of web UI in order to reflect changes in user manuals or other documents. Due to the volume of web pages that need to be reviewed, and the limitations of current text searching techniques, screen shot searches and subsequent document updates may not occur frequently. As a result, a web UT may progress through multiple changes that will not be identified by searching for keywords that are expected for earlier changes. Thus, some of these changes may be missed and not reflected in the next update of the corresponding manual or other document.

Other development team members could use screenshots as part of their respective processes. Program managers review UIs for various purposes and do not usually check the UI on live pages in browsers but prefer to leverage captured screenshots of the webpages. In addition, linguist reviewers often use web screenshots to more effectively check if expected translations are reflected on the latest build of a web-content offering.

Text searching web screenshots has been done using Optical Character Recognition (OCR), but this technique has several limitations. First, recognizing text characters in screenshots may be time consuming. Further, the task of recognizing text by this technique is made more difficult, and can require ever-increasing amounts of time and computing resources, by the fact that much of the text to be searched is mixed in or intertwined with multi-media content. Finally, and most importantly, the ability to recognize text characters using the OCR technique and extracting text graphically, is highly dependent on the quality of the image that is being analyzed. This means that the accuracy of text recognition—the degree to which OCR recognizes the existence of text and correctly identifies what the text includes—is a product of the quality of the image being analyzed.

Therefore, a need exists for systems and methods that enable accurate searching of screenshots of web content that is not dependent on the quality of the image of the screenshot being analyzed.

SUMMARY

Examples described herein include systems and methods for searching specific content in screenshots of web content independent of image quality. In one example, screenshots of web content are captured along with hypertext markup language ("HTML") sources used to generate and render the web content. Each screenshot can be given a name and assigned an identifier that can be used separately or in combination to link the screenshot to a respective HTML source and categorize the screenshot within a repository where it is stored. Each HTML source, can be modified to include a reference ID corresponding to the name and identifier given to a respective screenshot.

Each HTML source can be analyzed to determine a respective document object model (DOM). Based on a recognition of the DOM, the HTML source can be parsed, and nodes and associated attributes can be extracted. In one example, the extracted nodes and attributes can be of particular node (e.g., <body>, <div>, <input>, <label>, etc.) and attribute types (e.g., value, innerHTML, id, class, etc.) specified in an extraction scheme. The extracted nodes and key-value pairs for each associated attribute can be converted into items and item attributes in a DOM extraction file (DEF) that is encoded according to JSON or another self-describing-based language. The DEF can be linked to the HTML source with the same information linking the HTML source to a respective screenshot, and stored in the repository.

In one example, item attributes can be created for items in addition to item attributes that correspond directly to attributes extracted from an HTML source. According to an aspect of the present disclosure, a structure of a DOM created based on an HTML source can be recognized from the HTML source, and used to determine parent-child relationships between extracted nodes. Further, the parent-child relationships can be reflected in values for a "parent" item attribute associated with an item in a DEF that corresponds to the extracted node.

In addition, values for extracted attributes can be used to determine locations of nodes in respective screenshots. The locations and areas occupied by nodes in respective screenshots can be represented as absolute coordinates. In one example, absolute coordinates for extracted nodes can be determined as part of a process for creating a DEF. The absolute coordinates for each extracted node can be expressed as a value for a "region" item attribute associated with an item in a DEF that corresponds to the extracted node. In one example, absolute coordinates for extracted nodes can be determined based on positional relationships between parent and child nodes which are determined as part of a "parent" item attribute determination process. In one example, conversion of an extracted node's position into absolute coordinates may be accomplished by recursively offsetting the extracted node's position by positions of its parent nodes.

In one example, a keyword to be searched for in one or more screenshots can be received. According to an aspect of the present disclosure, items and item attributes of DEFs stored in a repository can be searched for the keywords. Any DEF including multiple keyword matches can be reviewed, and the "region" values for items having an item attribute including the keyword can be compared. The values for "parent" and "region" item attributes can be compared to determine: (a) a relationship between areas in a corresponding screenshot occupied by nodes corresponding to items with keyword matches; and (b) a parent-child relationship between the nodes. In one example, a first keyword match may be filtered out if it is for an item that corresponds to a node that occupies an area that surrounds an area occupied by a child node. The child node corresponds to another item that includes a second keyword match for the same keyword associated with the first keyword match, in an example.

In one example, keyword match information can include a reference ID for a DEF of an item including a keyword, and a value for a "region" for the item. The reference ID may be used to identify or retrieve a screenshot that is linked to the DEF. Further, the value for the "region" can used to locate an area for a node corresponding to the item of the keyword match. In one example, an area in the identified or retrieved screenshot for a node corresponding to the item can be encircled or highlighted using the "region" values which represent the absolute coordinates of the node within the screenshot.

In one example, the search of the node's corresponding item in the DEF reveals that the node includes the keyword. As a result, an identifying mark may be added around or over an extent of an area occupied by the node. As a further result, portions of the node including the keyword will be distinguished from other portions of the screenshot. Accordingly, independent of an image quality for the screenshot, content such as text can be searched for, located, and marked with a high degree of accuracy.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems for searching specific content in screenshots of web content independent of image quality. Screenshots of web content can be captured along with respective HTML sources. Prior to storage in a repository, the screenshots can be given respective names and assigned respective categories as part of an indexing process. The HTML sources can be: (a) linked to respective screenshots according the names and categories; and (b) parsed to identify nodes and associated attributes according to DOMs used to render the web content captured by the screenshots. For each HTML source, nodes and associated attributes of particular node and attribute types specified in an extraction scheme can be extracted and included as items and item attributes in a DEF. For each item in a DEF, "parent" and "region" item attributes can be created and populated with values that respectively reflect a parent-child relationship between a node corresponding to the item and other nodes, and a location of and area occupied by the node within a respective screenshot.

A user or an administrator can enter keywords into a search module of a user interface (UI) with access to the repository. The DEFs stored within the repository can be searched for the keywords and keyword matches can be returned. In one example, searching can be limited to items and item attributes that correspond to nodes and attributes of particular node and attribute types. Keyword match information can at least include "region" values for items in the DEFs including the keyword matches. Positional relationships between nodes corresponding to items within a single DEF that include a same keyword can be determined from respective "region" values. The determined positional relationships can be used to filter out duplicate keyword matches. The "region" values associated with remaining keyword matches can be used to locate and add identifying marks to areas within screenshots occupied by nodes that correspond to items that are included in DEFs linked to the screenshots and include searched-for keywords.

Figure 1:
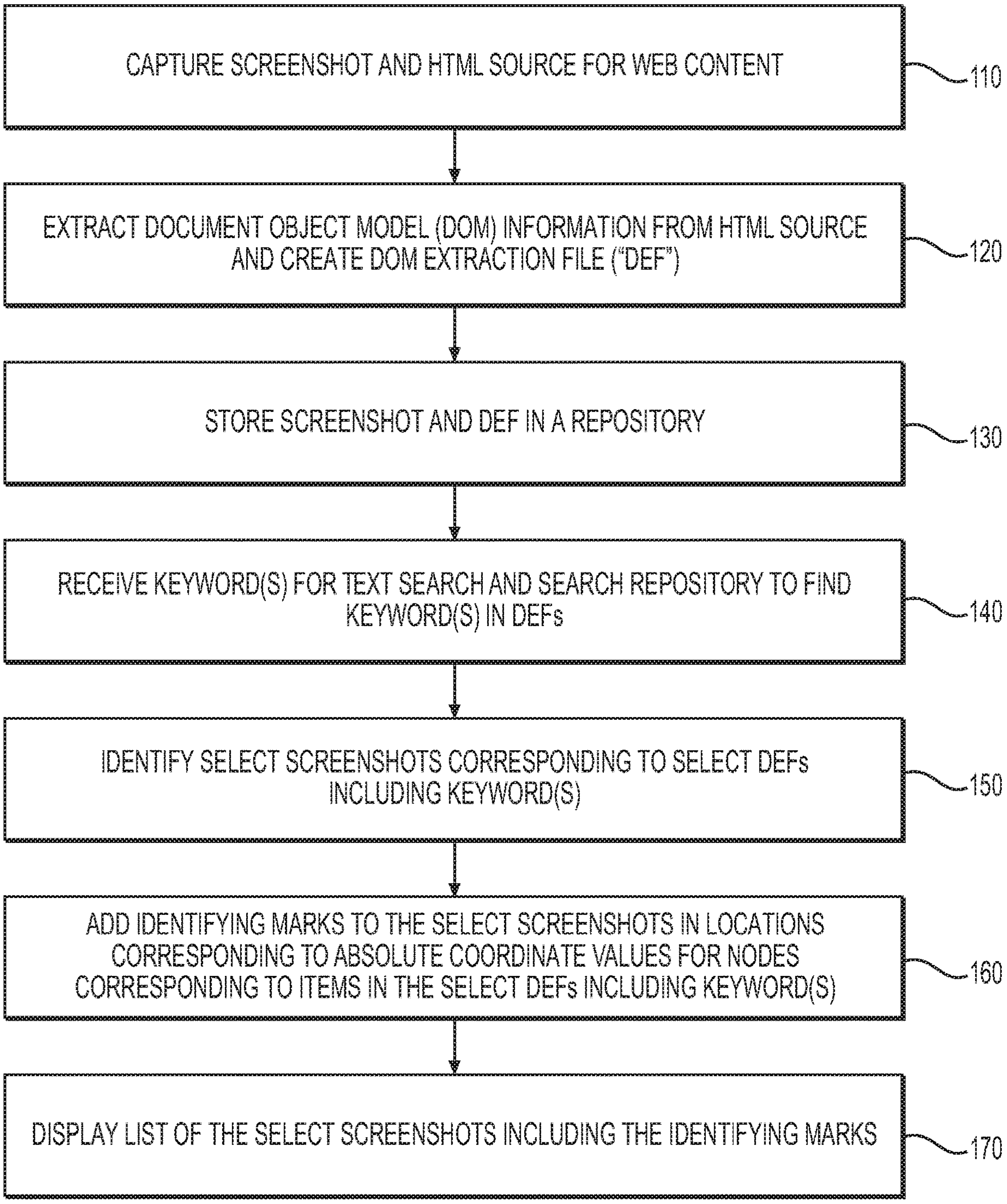
FIG. 1 is a flowchart of an exemplary method for searching screenshots of web content independently of image quality.
Figure 2:
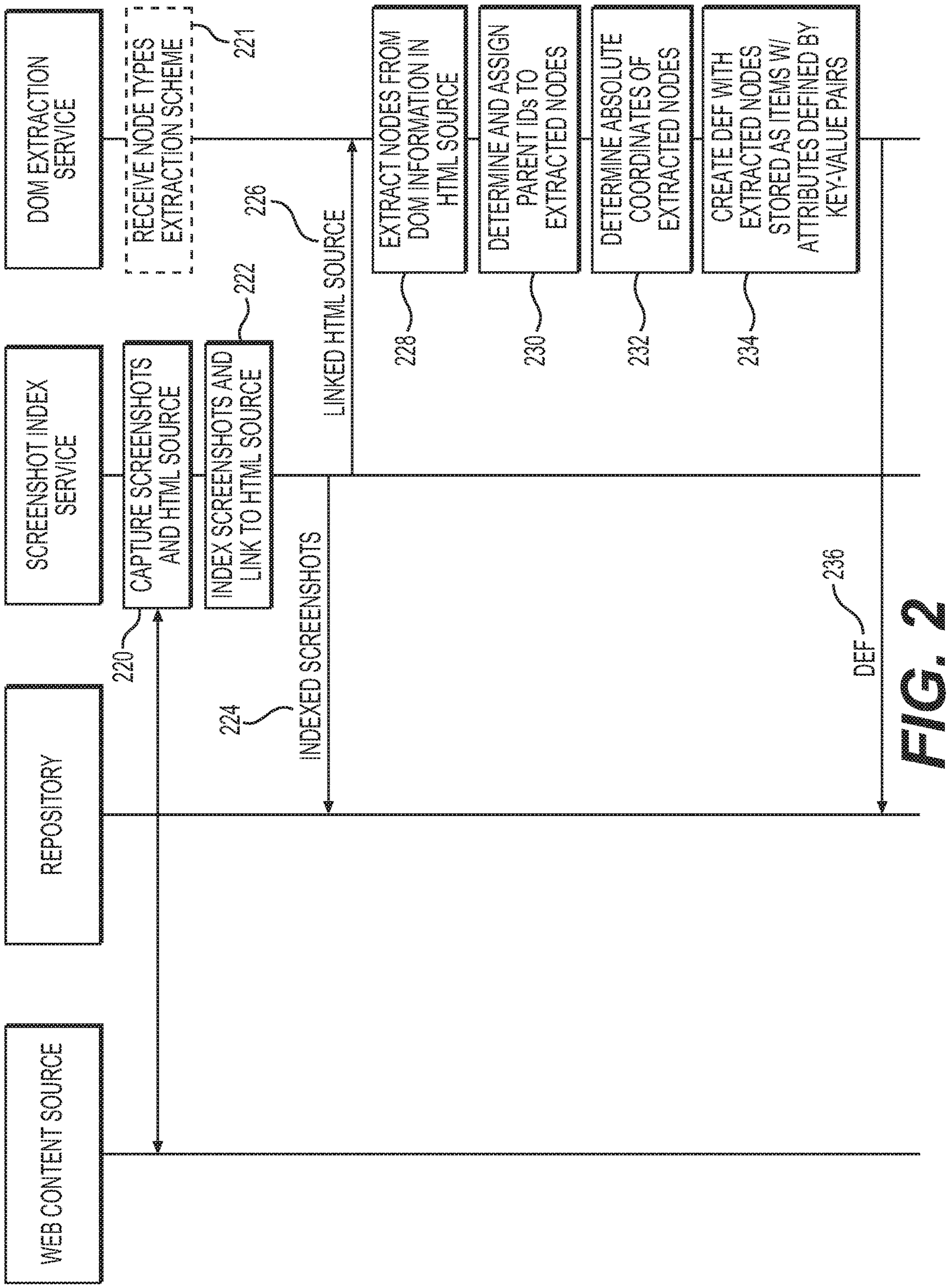
FIG. 2 is a sequence diagram of an exemplary method for creating a file that includes Document Object Model (DOM) information.
Figure 3:
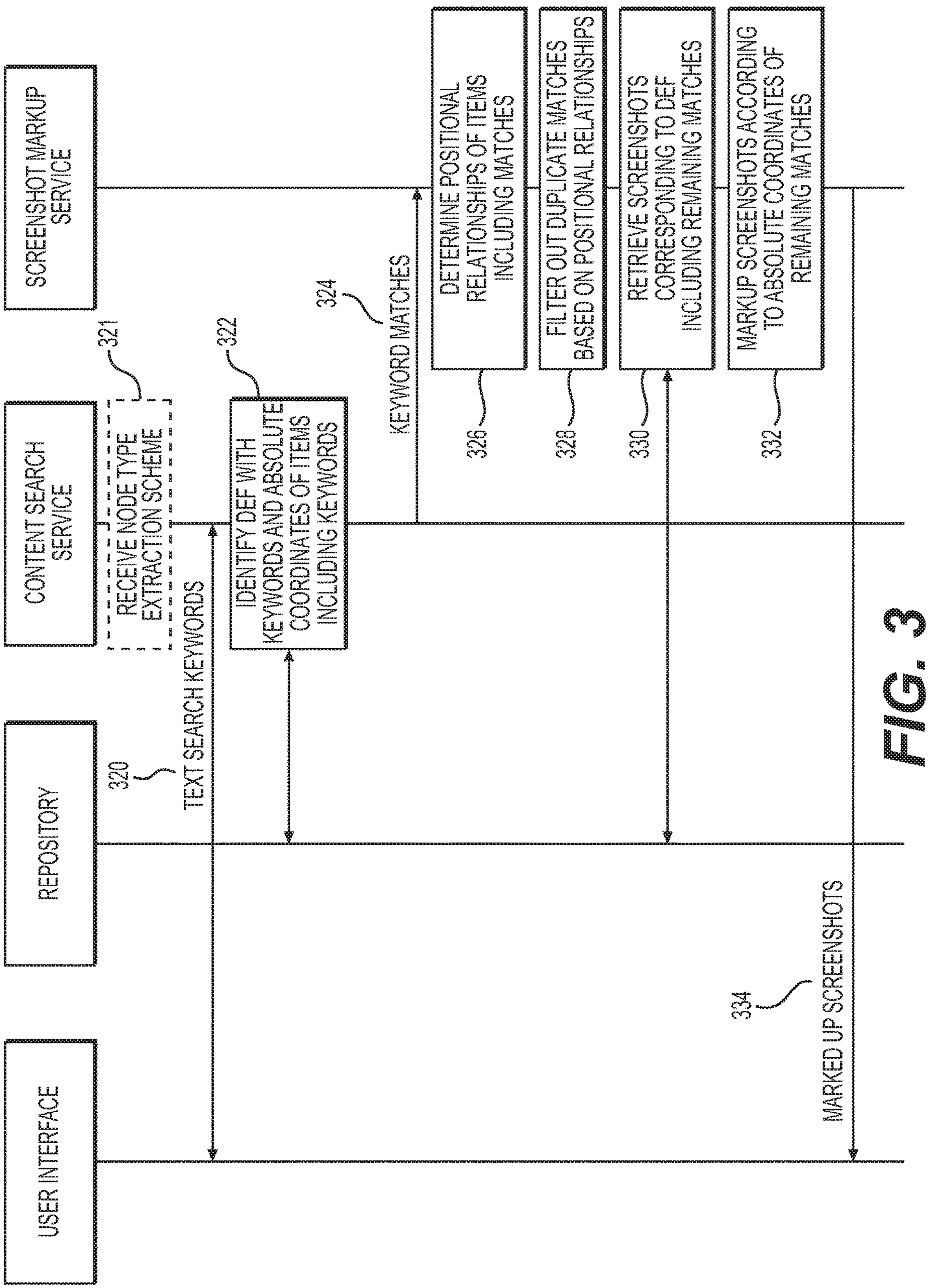
FIG. 3 is a sequence diagram of an exemplary method for marking locations within screenshots of web content that include searched-for keywords, and displaying the marked-up screenshots.
Figure 4:
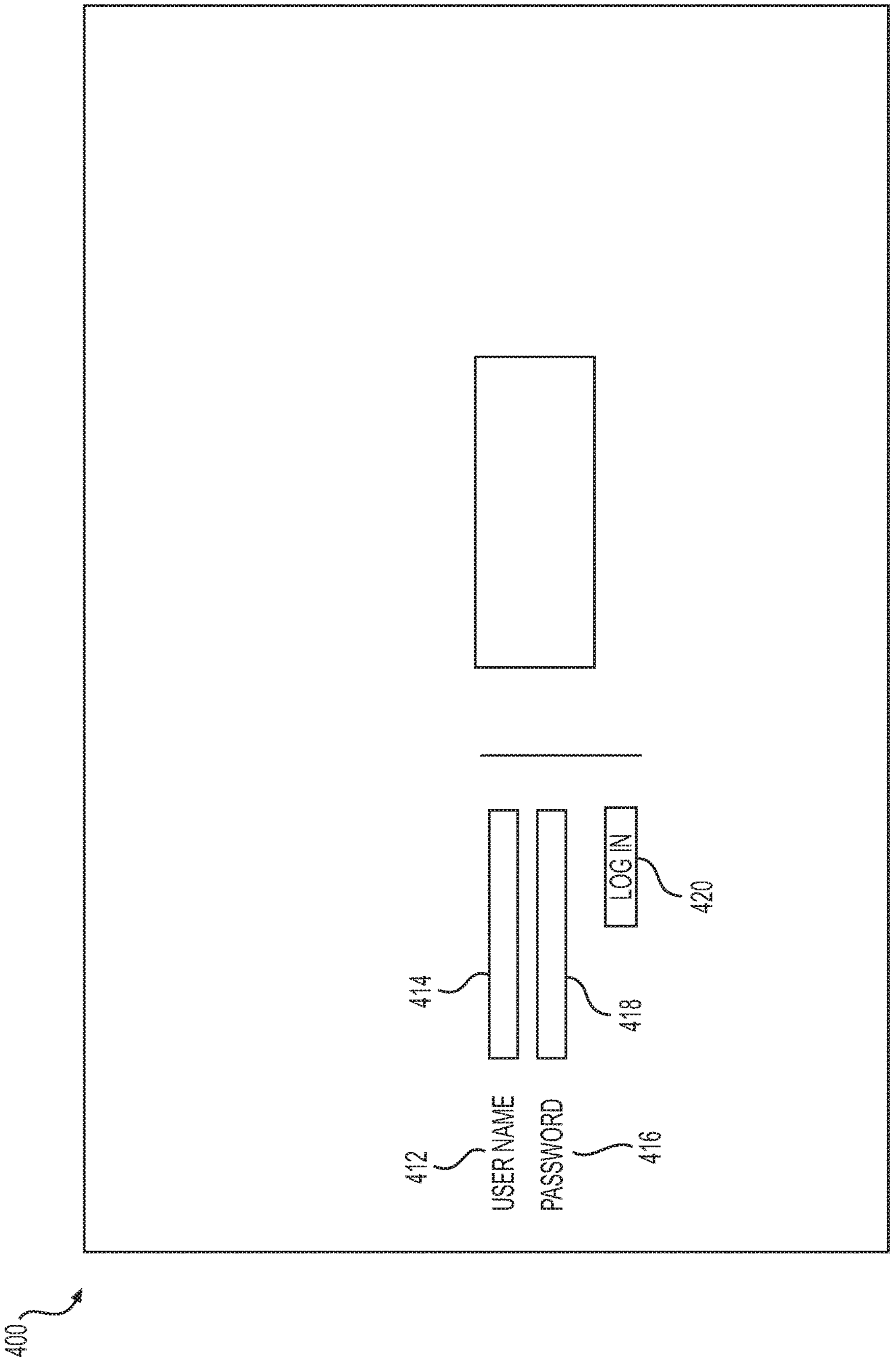
FIG. 4 is an exemplary illustration of a screenshot of web content.
Figure 5:
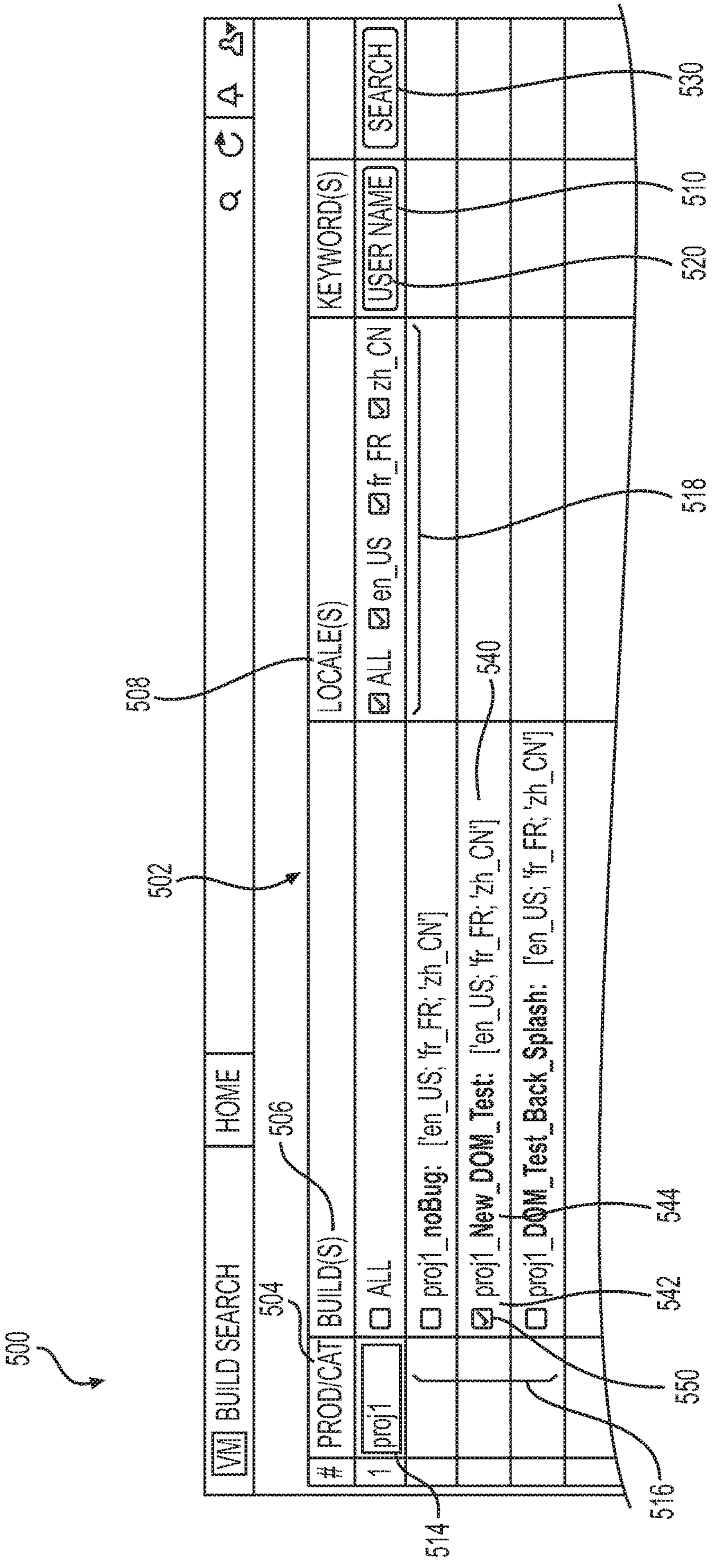
FIG. 5 illustrates an exemplary search entry module for a User Interface (UI) for searching for specific content in screenshots utilizing DOM extraction files (DEFs).
Figure 6:
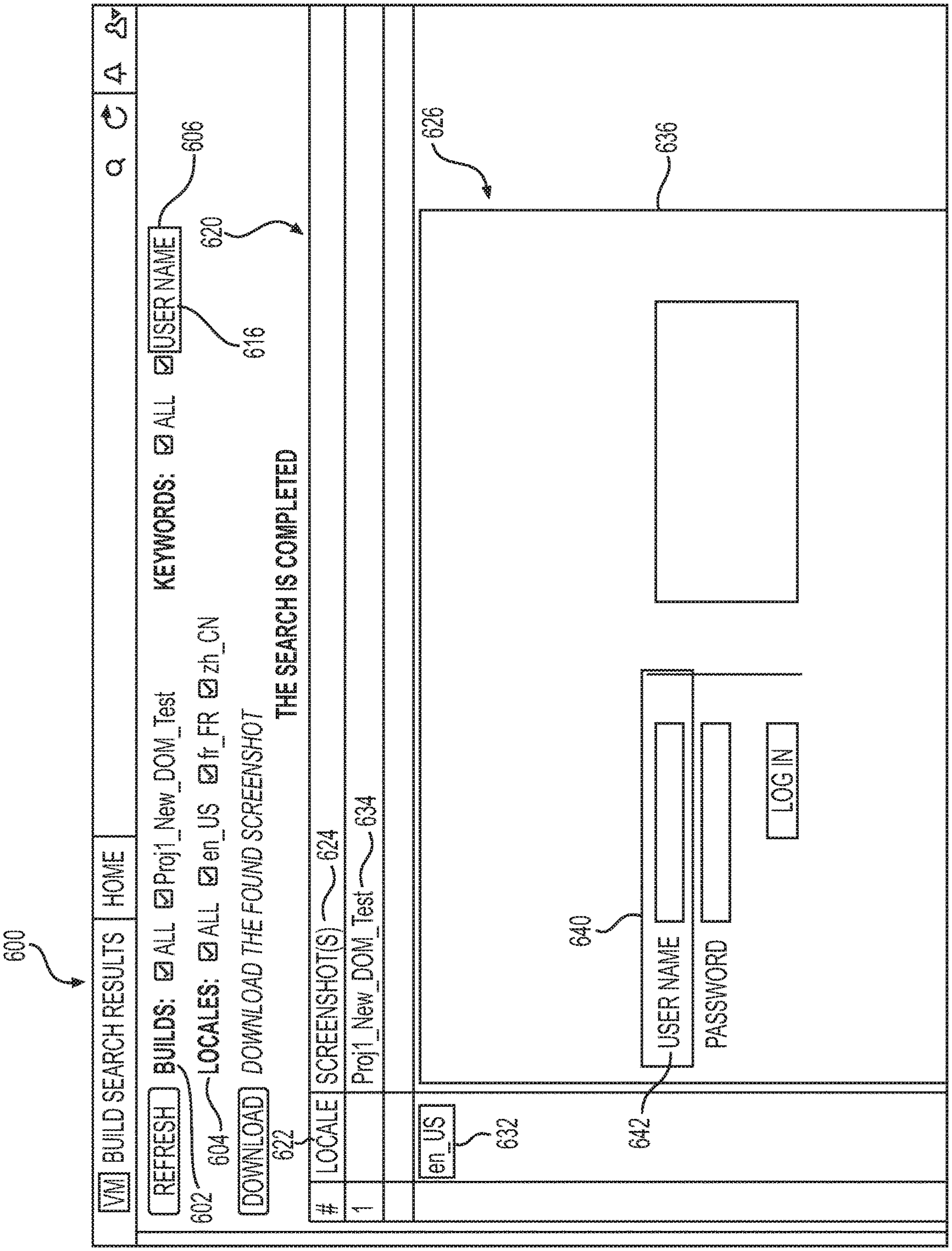
FIG. 6 illustrates an exemplary search results module for a UI including a marked-up screenshot selected from the search results.
Figure 7:
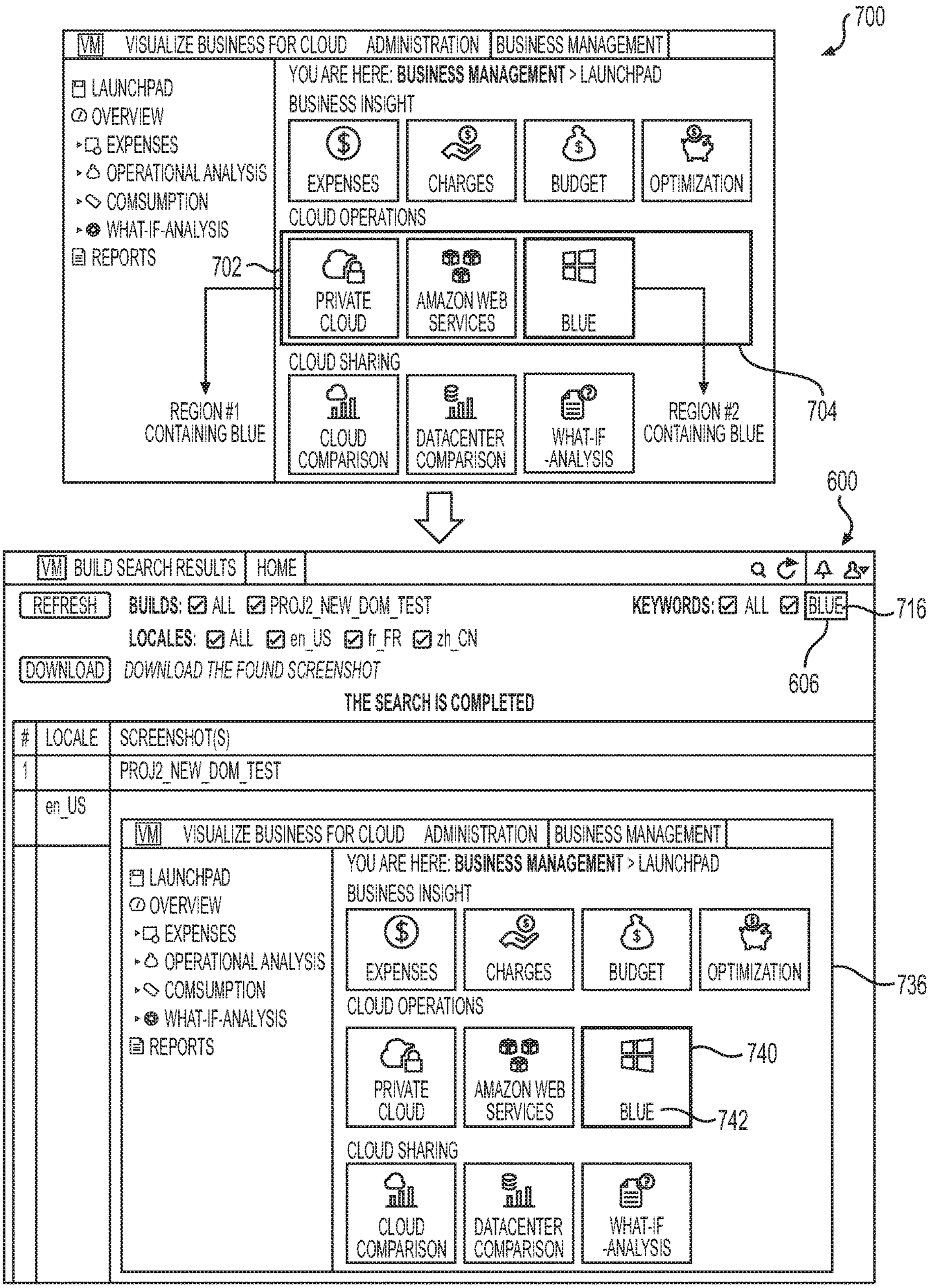
FIG. 7 is an exemplary illustration of a screenshot that includes overlapping regions that include the same searched for content.
Figure 8:
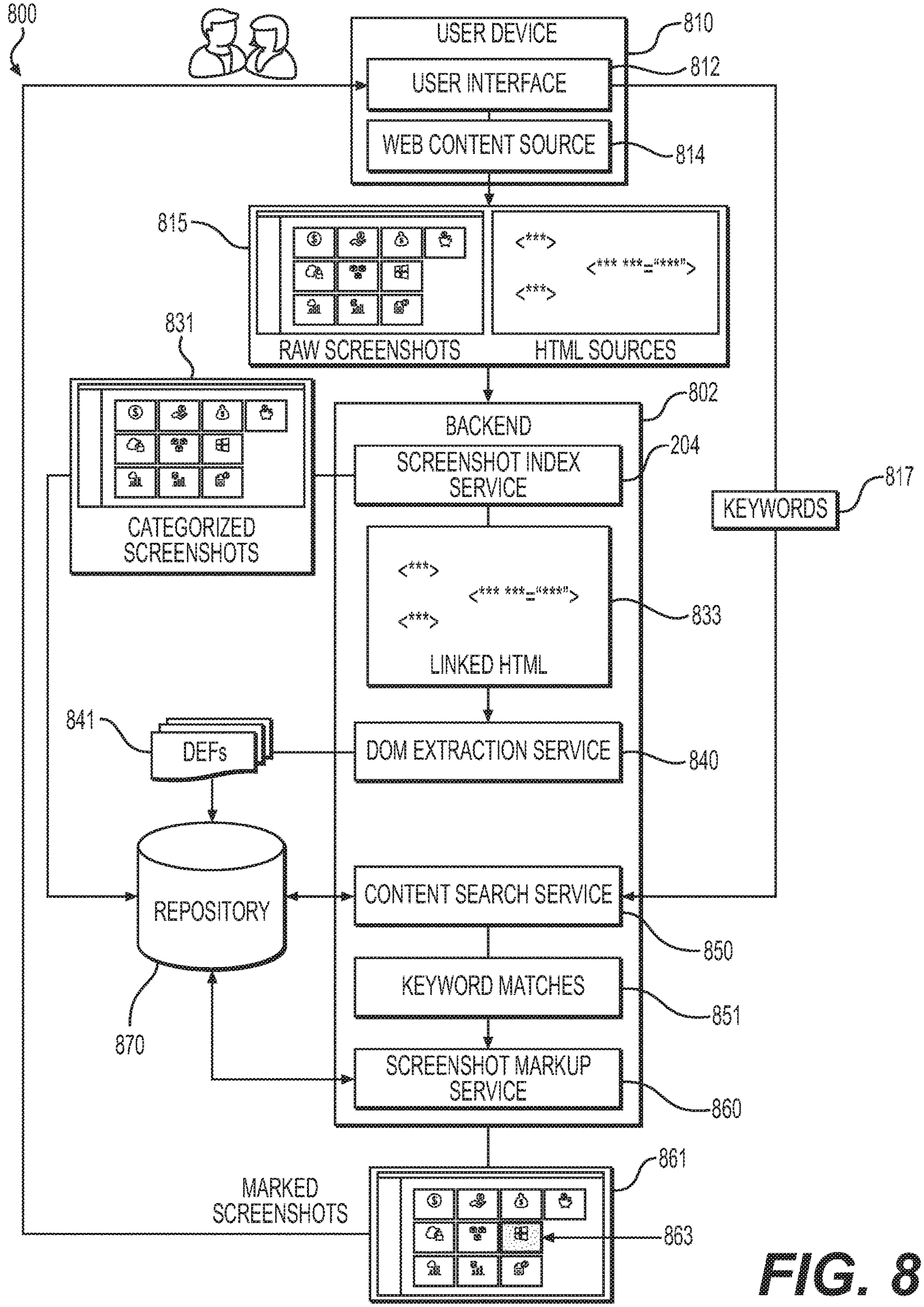
FIG. 8 is an exemplary illustration of system components for searching screenshots of web content independently of image quality.

FIG. 1 provides a flowchart of an example method for searching screenshots of web content independently of image quality. FIG. 2 provides a more detailed sequence diagram for a portion of the method of FIG. 1 that includes creating a file with Document Object Model (DOM) information extracted from an HTML source that is linked to a screenshot. FIG. 3 provides a more detailed sequence diagram for a portion of the method of FIG. 1 that includes marking locations within screenshots of web content. FIG. 4 is an exemplary illustration of a screenshot of web content. FIG. 5 illustrates an exemplary UI for searching for specific content in a DEF linked to the exemplary screenshot of FIG. 4. FIG. 6 illustrates an exemplary UI that displays search results marked in a location that includes a keyword. FIG. 7 is an exemplary illustration of a screenshot that includes overlapping node areas with the same searched for content, a duplicate match. In addition, FIG. 7 includes a search results module in the UI 600 that displays a final marked version of the screenshot with only a single match. FIG. 8 provides an illustration of exemplary system components for performing the methods of FIGS. 1-3.

Turning to the flowchart of FIG. 1, stage 110 includes capturing a screenshot of a web page or other content that is accessed through a network, such as the internet, and displayed on a computing device ("web page" or "web content"). The computing device can be a tablet, phone, laptop, or any other processor-enabled device. A screenshot for one or multiple webpages can be captured in stage 110. As a screenshot for a given web page is taken, the HTML source for that web page is also captured. The HTML source may be accessed and captured from a browser displaying the webpage for which a screenshot is taken, and subsequently linked to the screenshot for reference in other stages of the exemplary method of FIG. 1.

In one example, a screenshot indexing service ("indexing service") can generate a name for, and separately assign an identifier to, a screenshot of web content prior to, while, or after the screenshot is taken. The name of the screenshot may be used or referenced in linking a respective HTML source to the screenshot. The identifier may be used to categorize the screenshot among other screenshots that are stored in a repository that can be searched. Values for identifiers may be used as part of search criteria to narrow particular screenshots to be searched to one screenshot, a group of screenshots, or a particular group of screenshots. The identifiers may be assigned according to a relationship between a web page or instance of web content, and a website or additional web content that the webpage or instance of web content is a part of.

A "build" can refer to a project focused on developing a website including one or more webpages. A build number can refer to a name or number of a given development project for that website, a version of the website, or both. Further, each webpage of the website may have a unique sub-build number that is subjugated a build number of the website. According to an aspect of the present disclosure, an identifier assigned to a screenshot can correspond to a build number. Thus, in one example, screenshots of different webpages from the same website may be assigned the same identifier. In another example, the identifier can correspond to a build number assigned for a particular version of the website or webpage. The identifier can be used to narrow a search of screenshots that correspond to all of the webpages of a particular build project (e.g., website), or one particular webpage, or all of the various versions of a particular webpage.

At stage 120, the method can include extracting DOM information from the HTML source captured in stage 110 and creating a DOM Extraction File ("DEF").

A DOM can be a programming interface for HTML and XML documents. In general, a DOM defines a logical structure of a document and ways the document is accessed and manipulated. More specifically, a DOM is an object-orientated representation of web content and may be modified with a scripting language (e.g., JavaScript). A browser that implements a DOM application programming interface ("API") will receive raw HTML for a webpage and parse through it to recognize objects ("nodes") within the HTML. Each element (or tag) in the raw HTML may be recognized as a node, and attributes associated with these elements may be recognized as the raw HTML is parsed. The nodes and associated attributes may be organized into a structure according to a DOM standard to create a DOM for the webpage. Once created, the browser may use the DOM to render the webpage.

In stage 120, portions of information (e.g., nodes and associated attributes) may be extracted from the HTML source based on each portion's translation in terms of the DOM. The process of extracting these portions of information ("DOM information") is separate from the parsing and DOM creation processes that occur with a browser that renders the webpage for which a screenshot is taken. In another example, stages 110 and 120 can include capturing the DOM created from the web content and extracting the DOM information from the DOM.

The extracted DOM information may include attributes for some or all of the nodes identified from the HTML source. In terms of HTML, attributes are pieces of information or values that configure elements or adjust their behavior to meet a given criteria when a webpage is rendered. In one example, the attributes extracted in stage 120 are text-based key-value pairs. The key being a type of attribute defined in terms of HTML coding. The value extracted being the value of that type of attribute for the element in the HTML source including the key-value pair as part of its definition. In one example, the presence and value of an attribute for a node can be recognized for extraction based on the value of that attribute, or how the value is presented within the HTML source. This being in addition to recognizing attributes that are named within the HTML source (e.g., the "id" attribute in <h1 id="id5">Example of Named Attribute</h1>). For example, in stage 120, text within the HTML source that appears between two tags (e.g., <p>[text] <p>) can be recognized as the value for the "innerHTML" attribute for the element with the tag <p>. The types of HTML attributes that are extracted in stage 120 may include, but are not limited to, "tagname", "value", "id", and "innerHTML".

The extracted nodes and attributes are included in a DOM Extraction File ("DEF") in stage 120. The DEF may be a JSON, or other self-describing language, based file. An item is created in the DEF for each extracted node, and each item includes a series of key-value pairs corresponding to the attributes associated with the extracted node for that item ("item attributes"). The types of nodes and attributes extracted from the HTML source and represented in the DEF may be specified according to an extraction scheme. The extraction scheme may specify that the types of attributes extracted for one type of node are different from the types of attributes extracted for a different type of node. Further, the extraction scheme may specify that additional item attributes be created in the DEF for the items of the extracted nodes, in addition to the extracted HTML attributes. According to the extraction scheme, values for these created item attributes may be derived from relationships between nodes, or the values of particular types of HTML attributes for a given node or related nodes.

For example, the extraction scheme may specify that a "parent" item attribute be created for every extracted node (item). A value for this item attribute may be defined in terms of how the extracted node was organized within the structure of the DOM for the HTML source. In one example, the DOM structure consists of nodes arranged according to respective parent-child relationships between one another as defined in the HTML source. Every item in the DEF may have a key-value pair for "parent" that links that item to its parent container, which is a node that may be represented by a respective item in the DEF. Thus, identifying the parent of every extracted node serves to link the items in the DEF according to the positional relationships, within the screenshot, of the extracted nodes they represent.

In addition to "parent", a "region" item attribute may be created for each extracted node (item) in the DEF. A region may represent a location and size of a container that a node occupies in a screenshot. In one example, a "region" value for an extracted node (item) corresponds to a position of a node in a respective screenshot converted into an absolute coordinate of an entirety of that node within the screenshot. In one example, absolute coordinates for a node can including one set of X, Y coordinates for an upper left-hand corner, and another set of X, Y coordinates for a lower right-hand corner of a container (within a webpage) for the node. Thus, a region may represent the location and size of the container that the node represents in the screenshot. Values for respective "region" item attributes that are converted from node positions, may be determined or calculated based on comparative analyses of "parent" values for different nodes. In particular, a position conversion may be accomplished by recursively offsetting a position of a node by positions of parents of that node.

In addition to the items and item attributes, the DEF may include some type of identifier or reference that is common to the screenshot and its linked HTML source the DEF was extracted from. Accordingly, a review or processing of the DEF will reveal the screenshot where nodes corresponding to the items in the DEF are visually represented. The DEF may be assigned a reference ID consistent with the identifier and name of screenshot it corresponds to.

At stage 130, the method can include storing the screenshot and DEF in a repository. In one example the repository can be a repository that may be hosted on a server and accessible through a network, such as the internet. The repository may be accessible through the network and configured to receive search queries for searching items within the DEFs stored in the repository.

At stage 140, keywords may be entered into a user interface, for example, as part of a text search, and submitted to and processed by a content search service ("search service") executing on a backend configured to access the repository. The DEFs stored in the repository may be queried for the keywords submitted. The search service may search for certain item attributes of extracted nodes (items) in the DEFs according to a search criterion that specifies the types nodes to be searched. For example, the search service may search for the submitted keywords only within items that correspond to a node of an <input> or <button> type. Further, the search service can limit a search query to particular types of item attributes for the type of nodes being searched. For example, the search service can search for items corresponding to <div> or <span> node types, and only search the "innerHTML" item attribute of for these items.

When keywords are matched in certain item attributes, the search service may return match information. For each keyword match, the match information may identify: the DEF that includes the queried-for keyword(s); the items within the DEFs that include item attributes including the keywords; the "parent" values associated with those items; and the "region" values (absolute coordinates of corresponding nodes) associated with those items.

The search service can include management sub-agents such as an API, Software Development Kit ("SDK"), application wrapper, or workspace agent application. The management sub-agent can include privileges in managed applications operating on a computing device implementing a user interface, the repository, or the backend. These privileges can be developed for operation with a computing device implementing, or on which is implemented, a virtual machine, or a backend server(s) implementing agents.

At stage 150, the method can include identifying screenshots ("select screenshots") stored in the repository corresponding to DEFs including keyword matches ("select DEFs"). Stage 150 can be performed by a screenshot markup service ("markup service") that receives the match information from the search service. Data within the match information that identifies the select DEFs ("DEF identifiers") may correspond to the names and assigned identifiers for the select screenshots and HTML sources that the select DEFs are linked to and created from, respectively. The markup service may use the DEF identifiers to find the corresponding select screenshots in the repository.

At stage 160, the method can include the markup service adding identifying marks to the select screenshots. The identifying marks are added in locations corresponding to the absolute coordinates of nodes (region "values") corresponding to items in the select DEFs that include keyword(s). The markup service processes the "region" values for the keyword matches to find and mark the nodes corresponding to the items including the keywords.

The markup service may review each keyword match for a particular select DEF and compare the "region" values for those keyword matches. The "region" values for two items may indicate that an area occupied within a select screenshot of a node corresponding to one item, is located within, substantially overlaps, or partially overlaps an area occupied by another node corresponding to another item. In one example, the markup service may filter some of the keyword matches out based on a comparative analysis for the "region" values revealing particular positional relationships between the nodes corresponding to items including the keyword matches. In addition to the determined positional relationships, the filtering process performed by the markup service may take into account the parent-child relationships (as indicated by respective values for the "parent" item attributes) between items of a select DEF including keywords.

In one example, a keyword that is part of an attribute type (item attribute) of a parent node can be included in the child nodes. For example, a keyword that is part of a child node's attribute value can be found in an innerHTML attribute of the respective parent node. A keyword match for the item corresponding to the parent node may then qualify as a duplicate match for the keyword match for the item corresponding to the child node. Adding an identifying mark to a screenshot for both nodes may be confusing to a user that views the marked-up version of the screenshot.

To avoid confusion, the markup service may filter out one match of this duplicate match. In one example, a keyword match may be filtered out if it is for an item that is a parent to another item which (a) includes the same keyword, and (b) has a "region" value that indicates the node of the child item is completely within the area of the node of the parent item. In other words, the markup service can identify the positional relationships of the nodes of duplicate matches and avoid making duplicate marks. For example, if the absolute coordinates ("region" values) of a node are completely inside of those of another node, an identifying mark for the node of the outer area will not be included in the select screenshot. In that example, only the inner area node will be marked.

As part of stage 160, the markup service can also consolidate all the remaining nodes that have not been filtered, in an example. Subsequent to the consolidation, the markup service may add all the appropriate identifying marks to the select screenshot(s) in the areas of the remaining nodes. In one example, the identifying marks may include a box that follows the boundaries of the absolute coordinates for a node (item) with a keyword match. In another example, the area encompassed in the select screenshot by the absolute coordinates may be highlighted. In yet another example, the identifying marks may include a box and a highlighted area within the box.

Similar to the search service, the markup service can include management sub-agents that includes privileges in managed applications operating on a computing device implementing a user interface, the repository, or the backend. In one example, the markup service may operate on the backend, and identify and retrieve the screenshots from the repository. Accordingly, the markup service may operate on the backend to add the identifying marks to the retrieved screenshots. In another example, the markup service may have privileges to operate within the repository. Accordingly, the markup service may operate on the repository to add the identifying marks to screenshots and transfer the marked screenshots to the backend.

At stage 170, the method can include the select screenshots including identifying marks being displayed, or represented for selection for display, in a user interface. The marked screenshots may be transferred from the backend or the repository to the user interface.

FIG. 2 provides an example sequence diagram encompassing the stages directed toward searching screenshots described in FIG. 1, and showing interactions between various system components. At stage 220, a screenshot index service ("index service") can capture a screenshot and HTML source of web content from a web content source such as a browser being implemented on a computing device. In another example, the web content source can be an enterprise server that supports network applications, manages content and data access for a network application or external website for the enterprise, or accesses enterprise documents and data stored in a cloud through a web-based interface.

In one example, a screenshot that is captured for a web page, for example, may comprise only the portion of the webpage that is visible in a display of a computing device from which it is captured. In another example, the screenshot may comprise the entirety of the webpage, both a visible portion and any portion not visible due to the size of the display of the computing device. In one example, the HTML source that is captured with a screenshot includes the raw HTML from which the entire web page is generated, and not just the portion of the webpage that is displayed. In another example, the HTML source captured may correspond to just the portion of the webpage being displayed.

At stage 222, the screenshot index service can name and assign a category identifier to the screenshot, and link the HTML source to the screenshot. In one example, the name given to a screenshot can include a timestamp corresponding to when the screenshot was captured. In another example, the name of the screenshot can reflect the source from which it was captured. Other naming schemes may also be implemented by the indexing service. The indexing service can assign a category identifier to the screenshot according to an application implementing the corresponding webpage, a website that the webpage belongs to, a build number of the webpage, or a combination of these elements.

In one example, naming and assignment schemes for the indexing service can correspond to data categorization schemes implemented by the repository, which receives the indexed screenshots at stage 224. At the same time, or after, the indexing service can transmit the linked HTML source to a DOM extraction service ("extraction service") in stage 226.

Table 1 includes an example of an HTML source, HTML Source 1 (HTMLS-1), that has been linked to a corresponding captured screenshot and may be transmitted to the DOM extraction service at stage 226. A transmitted HTML source may include substantially the same content as the raw HTML source used to render a webpage corresponding to the captured screenshot. However, as shown in Line 1 of Table 1, the screenshot index service may modify the raw HTML source in stage 222 to include a reference ID (text following end bracket "]" in Line 1) to link it to the corresponding screenshot. The text between the brackets ([ ]), where SS stands for "screenshot," is included for explanatory purposes. In HTMLS-1, the reference ID includes a category identifier, "ProjectX", and a name consisting of a timestamp "01012020", respectively assigned and given to a screenshot corresponding to HTMLS-1 in stage 222.

TABLE 1

| HTML Source 1 (HTMLS-1) |
| --- |
| Line 1: <!----- [Reference ID = SSCategory_SSName] ProjectX_01012020:143025 ----> |
| Line 2: <div> Click |
| Line 3: <input type="button" value="OK" > |
| Line 4: </div> |

Table 2, which follows, includes DOM Extraction File 1 (DEF-1) for HTMLS-1, and will be referred to in explaining stages 221, 228, 230, 232 and 234 performed by the extraction service.

TABLE 2

DOM Extraction File-1 (DEF-1) for HTMLS-1

```
{"items":[
    {"item":"item0",
        "item attributes": {"id": "id0",
                            "tagname": "comment",
                            "parent": "none",
                            "value": "ProjectX_01012020:143025",
                            "innerHTML": "",
                            "region":"none"}},
    {"item":"item1",
        "item attributes": {"id": "id1",
                            "tagname": "div",
                            "parent": "none",
                            "value": "",
                            "innerHTML": "Click <input
                            type = "button" value= "OK">",
                            "region":"(0,10,60,40)"}},
    {"item":"item2",
        "item attributes": {"id": "id2",
                            "tagname": "input",
                            "parent": "id1",
                            "value": "OK",
                            "innerHTML": "",
                            "region":"(5,5,25,15)"}}]}
```

Each "item" in Table 2 corresponds to a node extracted from HTMLS-1. In the case of HTMLS-1, a <comment> node from line 1, a <div> node from lines 2-4, and an <input> node from line 3 have each been extracted and represented as an item in DEF-1. HTML attributes from the nodes are included as item attributes in DEF-1. For example, the only node to include innerHTML content in HTML-1 is the <div> node. That content is included as the value for an "innerHTML" item attribute of item2, which corresponds to the <div> node in DEF-1. Which nodes and attributes are extracted from an HTML source may be set by an extraction scheme that is implemented by the extraction service in stage 228. For example, the extraction scheme can specify that only one <comment> node that includes a value for a particular HTML attribute in a specific format is to be extracted. Thus, a <comment> node including a reference ID that was added to the beginning of an HTML source like HTMLS-1 in Table 1, can be extracted as an item, like item0 of DEF-1 in Table 2, and used as a reference for another process.

At stage 228, the extraction service can parse through the HTML source similar to a browser that parses through the HTML source to create a DOM as part of a webpage rendering process. The extracted DOM information will include nodes and attributes of the types specified by the extraction scheme and identified in the HTML source. In one example, the extraction scheme can be configured to recognize particular nodes that are not visible when web content is rendered. In one example, the extraction scheme can specify particular node types or values for particular HTML attributes that are associated with invisible nodes and cause the extraction service to omit extracting these nodes.

At stage 221, the extraction service receives an extraction scheme. In one example, the screenshot indexing and extraction service may be implemented on a backend. A UI executing on the backend can prompt an administrator for which nodes and attributes are to be extracted from an HTML source. Accordingly, the administrator may design the extraction scheme, but in another example, the extraction scheme may be generated by another service implemented by the backend. Otherwise, a default configuration can be used. In another example, the extraction service may include a default extraction scheme and stage 221 may be omitted. In yet another example, a UI executing on the backend can prompt an administrator to select the default extraction scheme or an option to customize the extraction scheme. In yet another example, stage 221 may be performed in response to, as opposed to before, the extraction service receiving an HTML source in stage 226. The extraction scheme may define any additional item attributes that will be added to items, and how they are derived from attributes in the HTML source in stages 230 and 232. In another example, stage 221 is omitted.

At stage 230, the extraction service can create a "parent" item attribute and determine a value for this item attribute for each node extracted in stage 228. In one example values for the "parent" item attributes are determined based on how an extracted node fits within the structure of a DOM (as appreciated from the HTML source) that is used to generate the webpage from which a linked screenshot is taken. With reference to HTMLS-1, in a DOM for this HTML source, the <input> node would be a child of the <div> node. Based on the way the code in the HTML source is structured (indented, bulleted, or part of the innerHTML of another node, etc), the extraction service is configured to recognize parent-child relationships between the nodes and assign "parent" values using the "id" values determined for the nodes. For example, in HTMLS-1, the <div> node is not subjugated to another node, and the <input> is part of the innerHTML of the <div> node. Accordingly, the <div> node, or item1 having an id of "id1", does not have a parent. On the other hand, the <input> node, or item2, is a child of the <div> node, and therefore a "parent" value for item2 is "id1" (=item1/<div> node).

At stage 232, the extraction service can create a "region" item attribute and determine an absolute coordinate within a webpage for a value of this item attribute for each node extracted. In one example, the extraction service can implement a series of JavaScript APIs, such as offsetLeft, offsetTop, and offsetParent for example, to determine the positions of the extracted HTML nodes. In recognizing a node type for a given node, and an identity of a parent node for the given node, a determination can be made as to the positions of where the nodes are displayed.

For example, IFRAME is a specific type of container that behaves like a window. Each node that may be contained in an IFRAME may represent its position relative to the IFRAME, rather than a full window or screen. If these raw positions are used to determine their respective absolute coordinates, the values determined will potentially be offset from their absolute positions relative to the window or screen, by an amount of an offset for between the IFRAME and the window. In such a scenario, the extraction service will recognize that the nodes in the IFRAME are children of the IFRAME and their "region" values must account for their respective offsets relative to the IFRAME, and an offset of the IFRAME relative to the window or screen. On the other hand, an HTML node, for example like the <div> node in HTMLS-1, which has a position that is simply relative to a root HTML node (and thus a window or screen), that position can be used directly to determine a "region" value, and later on to mark the node on screenshot.

At stage 234, the extraction service creates a DOM extraction file (DEF), such as DEF-1 of Table 2. In particular, the extraction service may include each extracted node and respective set of attributes in a JSON-based or other self-describing language-based file, as items and respective item attributes. The item attributes may be expressed as text-based key-value pairs.

In one example, a DEF may include an item corresponding to a <comment> node that was added to the beginning of an HTML source like HTMLS-1 in Table 1, and include a reference ID. As a result, the <comment> node will be the first extractable node identified and extracted by the extraction service and assigned to a first item in a DEF like DEF-1 of Table 2. In one example, <comment> nodes may always be extracted as the first item in DEFs created by the extraction service. A system processing a DEF may be configured to recognize, or always refer to, the first item in a DEF to obtain a reference for use in finding a correct screenshot in the repository. In another example, the extraction service can be configured to recognize a reference ID independent of where a respective <comment> node is in an HTML source. In yet another example, the extraction service may assign a specific ID to the item corresponding to the <comment> node (or other node type) with the reference ID. In turn, the specific ID may be read from a DEF and used by other components of a system to look up and retrieve a screenshot linked to that DEF.

In one example, the extraction service can extract all the HTML nodes from the linked HTML source in stage 228, and perform parent assignments and absolute coordinate determinations for each node in stages 230 and 232 respectively. The extraction service may selectively perform the total node extraction after analyzing the HTML source and the extraction scheme in stage 228. For example, the extraction service may determine that insufficient information exists to determine absolute coordinates of nodes based on the information provided from the nodes. As a result, the extraction service may perform a total node extraction in stage 228, and delay a node extraction pursuant to the extraction scheme until stage 234 when the DEF is created. In another example, stage 228 may be omitted and the delayed extraction scheme node extraction can be performed in stage 234 where a DOM for a captured screenshot is obtained in stage 220 and transmitted to the extraction service in stage 226.

At stage 236, the extraction service can transmit the DEF to the repository which previously received the screenshot in stage 224. The DEF may be linked to the screenshot of stage 224 by virtue of, for example, an extracted <comment> node.

FIG. 3 provides an example sequence diagram including stages directed toward marking screenshot in locations of nodes that include keyword matches described in FIG. 1, and showing interactions between various system components. At stage 320, the search service can receive keywords for a text search from a user interface. The user interface may provide an option to specify a category, which may correspond to a name of a build project or a build number, to narrow the scope of an ensuing search of DEFs falling into the specified category.

The search service may optionally receive an extraction scheme in stage 321, which the search service may analyze and use to configure a search method employed in stage 322 discussed below. For a given item in a DEF, a value for a respective "tagname" item attribute may correspond, and be used to recognize, a node type (e.g. <text>, <comment>, <input>, <label>, <script>, <div>, <p>, <h>) of an extracted node the item corresponds to. Thus, the search service may process the extraction scheme and recognize the types of nodes of the items, and the types of item attributes it will encounter in searching the DEFs in the repository, and limit a search process to particular node types and particular item attribute types within those nodes types.

For example, based on the extraction scheme, the search service may determine it will search through DEFs that include items corresponding to <input>, <button>, <div>, and <span> nodes. From this information, the search service may be configured to search the values of "value" item attributes in the <input> and/or <button> nodes (items), and the values for the "innerHTML" item attributes of the <div> and <span> nodes (items). Filtering of search considerations can be based on, or independent of, the keywords received.

At stage 322, the search service can search through DEF files in the repository for the keywords. As noted above, the search service may limit its search to DEFs that include reference IDs that indicate the DEF is linked to a screenshot grouped into a particular category. Further, the search service may limit the items and item attributes it searches based on the types of nodes and attributes they respectively correspond to. In one example, upon determining that an item in a DEF includes the keyword, the search service will obtain keyword match information including a value of a "region" item attribute for each item in the DEF including a keyword, and the reference ID for the DEF. The keyword match information may include values for "id", "parent", and "region" item attributes for items, and the reference ID of the DEF including the items.

At stage 324, the search service can transmit the keyword matches, each including its respective keyword match information, to the markup service.

At stage 326, the markup service can determine positional relationships between nodes corresponding to items with keyword matches based on "region" values in respective keyword match information. In one example, the "region" values for keyword matches for the same DEF may be compared and the markup service may determine if areas of nodes corresponding to the items with the keywords matches substantially overlap, partially overlap, or one area is entirely within another area.

At stage 328, the markup service can determine which keyword matches are duplicates and filter those out. In one example, the markup service may determine that one keyword match is a duplicate match if it entirely surrounds an area ("region" value), or overlaps the area beyond a preset threshold, of another keyword match. In another example, the markup service can consider, based on keyword match information, whether a node corresponding to an item with a keyword match is a parent or child of a node corresponding to another item with a keyword match in the same DEF. Once the duplicate matches are filtered out, the markup service consolidates the remaining keyword matches in order to search for screenshots linked to the DEFs including the remaining keyword matches in stage 330. The markup service can analyze the keyword matches to identify and filter out any matches corresponding to invisible nodes.

At stage 330, the markup service can search for screenshots in the repository. In one example, the markup service can obtain a list of reference IDs from the keyword match information for the remaining keyword matches. With the list of reference IDs, the markup service can search for screenshots in the repository having a name, or a name and a category, that matches the reference IDs in the list. Matches with the reference ID representing screenshots that are linked to the DEFs including the remaining keyword matches. A reference ID match criterion can be set on a backend by an administrator, or through the user interface by a user. The screenshots having a name, or name and category matching at least one reference ID may be identified, or identified and retrieved, for marking by the markup service in stage 332.

At stage 332, the markup service can add identifying marks to screenshots in locations that include keyword matches. For each identified or retrieved screenshot, the markup service analyzes values of "region" item attributes in the keyword match information for the remaining keyword matches that apply to that screenshot. Next, identifying marks are added to that screenshot over areas defined by the absolute coordinates the "region" values represent. As a result, respective areas in the screenshot for nodes that correspond to items that include the remaining keyword matches are marked and can be easily noticed by a user that initiated a search for particular keywords. Marks added to screenshots may include boarders around areas defined by absolute coordinates, these areas being highlighted, or both.

As discussed above, in one example, the markup service can retrieve the appropriate screenshots (or copies of) from the repository and add identifying marks. At stage 334, the screen markup service can transmit the marked-up screenshots to the user interface. In another example, the screen markup service can identify the appropriate screenshots, and add identifying marks to the screenshots (or copies of) that persist in the repository. Accordingly, the markup service can cause the repository to transmit the marked-up screenshots to the user interface in stage 334. In yet another example, in stage 334, the markup service can cause the repository to store the marked-up screenshots according to a particular protocol (categorization and storage scheme). Further, the markup service can transmit search results and access instructions or keys to the user interface that enable the user interface to connect to the repository, and view the marked-up screenshots persisting in the repository per the protocol.

The method of FIGS. 1-3 and can be used by web developers, quality engineers, technical writers, program managers, linguist reviewers, and the like to check web-content offerings (e.g. websites) for specific content. The method of FIGS. 1-3 includes searching the HTML source according to what would be the content of a DOM created from the HTML source. With this, the method can be used to search for specific content within screenshots corresponding to the HTML sources, completely independently of image quality. This can help reduce image quality dictating the accuracy of, for example, the output of an OCR tool that processes the screenshots. This can substantially improve the degree of accuracy to which content issues are identified and resolved for build projects that web developers, quality engineers, technical writers, program managers, and linguist reviewers work on.

For example, the method of FIGS. 1-3 could be used to search texts in hundreds of captured screenshots by multiple keywords containing non-English characters, symbols, and even emojis. In comparison to a manual operation of searching 200 screenshots, the method of the present disclosure may miss less keywords and complete the process more quickly.

FIG. 4 is an exemplary illustration of a screenshot of web content, specifically a webpage screenshot 400 for a login page. As shown in FIG. 4, the webpage screenshot 400 includes a first label 412, a first entry field 414, a second label 416, a second entry field 418, and a button 420. Table 3 below includes a portion of an HTML source (HTMLS-2) for the webpage screenshot 400 that has been indexed, as would be done in stage 222. HTMSL-4 includes a <comment> node with a category and name corresponding to webpage screenshot 400.

TABLE 3

Portion of HTML Source for FIG. 4 (HTMLS-2)

| | RAW HTML | ITEM NO. |
|---|---|---|
| HTML/ DOM NODES | <!----- proj1_New_DOM_Test ----> | 0 |
| | ▼ <div id="example" class="logincontainer"> | 1 |
| | ▼ <div id="loginform"> | 2 |
| | ► <p class="loginRow ng-hide" ng-show="devmode \|\| elect">... </p> | — |
| | ▼ <p class ="loginRow"> | — |
| | ▼ <label id="username-label" class="loginLabel"> "User name " ==$0 | 3 |
| | <input id ="username" aria-labelledby="username-label" tabindex="2" focus-me="true" ng-disabled="loggingIn" ng- class="{loginfailed: loginfailed}" class= "margeTextInput ng-pristine ng-valid ng-touched" type="text" ng-model= "credentials.username"> | 4 |
| | </label> | |
| | </p> | |
| | ▼ <p class = "loginRow" > | — |
| | ▼ <label id="password-label" class="loginLabel"> "Password " ==$1 | 5 |
| | <input id ="password" aria-labelledby="password-label" tabindex="2" focus-me="true" ng-disabled="loggingIn" ng- class="{loginfailed: loginfailed}" class= "margeTextInput ng-pristine ng-valid ng-touched" type="text" ng-model= "credentials.password"> | 6 |
| | </label> | |
| | </p> | |
| | <p> </p> | — |
| | ▼ <p id="loginButtonRow"> | — |
| | <div id="submit"> Click | 7 |
| | <input id="useroption" type="button" value="Login" > | 8 |
| | </ div> | |
| | </p> | |
| | </ div> | |
| | ► <div id ="product Name" >...</ div> | |
| | </ div> | 9 |

Each row in Table 3 below "RAW HTML" corresponds to a node that may be recognized in the creation of a DOM for the webpage of webpage screenshot 400. The "ITEM NO." column notes items in a DEF (see Table 4) for HTMLS-2 that correspond to the nodes.

TABLE 4

Portion of DOM Extraction File (DEF) corresponding to HTMLS-2 (DEF-2)

{"items":[
{"item":"item0", "item attributes": {"id": "id0", "tagname":"COMMENT", "parent": "none", TABLE 4-continued

| Portion of DOM Extraction File (DEF) corresponding to HTMLS-2 (DEF-2) | |
|---|---|
| | "value":"proj1_New_DOM_Test", "innerHTML":"", "region":"(0, 0, 0,0)"}}, |
| {"item":"item1", "item attributes": | {"id": "example", "tagname":"DIV", "parent": "none", "value":"", "innerHTML":"Login form Product name", "region":"(0,10,550,575)"}}, |
| {"item":"item2", "item attributes": | {"id":"loginform", "tagname":"DIV", "parent": "example", "value":"none", "innerHTML":"User name Password", "region":"(0,320,405,455)"}}, |
| {"item":"item3", "item attributes": | {"id":"username-label", "tagname": "LABEL", "parent":"loginform", "value": "User name", "innerHTML":"none", "region" :"(44,331,415,347)"}}, |
| {"item":"item4", "item attributes": | {"id":"username", "tagname":"INPUT", "parent": "username-label", "value":"none", "innerHTML": "none", "region":"(161,335,361,340)"}}, |
| {"item":"item5", "item attributes": | {"id":"password-label", "tagname":"LABEL", "parent":"loginform", "value":"Password", "inner HTML":"none", "region":"(44,367,415,384)"}}, |
| {"item":"item6", "item attributes": | {"id":"password", "tagname":"INPUT","parent": "password-label", "value":"none", "innerHTML": "none", "region":"(161,372,361,377)"}}, |
| {"item":"item7", "item attributes": | {"id":"submit", "tagname":"DIV", "parent": "loginform", "value":"", "innerHTML":" Click <input type ="button" value= "Login">", "region":"(175,405,400, 450)"}}, |
| {"item":"item8", "item attributes": | {"id":"useroption", "tagname":"INPUT", "parent": "submit", "value":"Login", "innerHTML":"none", "region":"(266,421,363,439)"}}, |
| {"item":"item9", "item attributes": | {"id":"productName", "tagname":"DIV", "parent": "example", "value": "none", "innerHTML":"none", "region":"(450,345,499,475)"}}]} |

As shown in FIG. 4 and HTMLS-2, the nodes in HTMLS-2 with Item No. designations of 3, 4, 5, 6, and 8, correspond to nodes for the first label 412, first entry field 414, second label 414, second entry field 418, and button 420, respectively.

FIG. 5 illustrates an exemplary search entry module for a UI 500 for searching specific content in screenshots. The UI 500 may include a dashboard 502 with a prod/cat (product/category) section 504, a build section 506, and a locale (language) section 508. Each section may include checkboxes or entry fields for narrowing a pool of screenshots to be searched for a keyword 520 entered into a search entry field 510. For example, the prod/cat section 504 may include an entry field 514 where a product or category can be specified. The build section 506 may include first checkboxes 516 for selecting all or particular builds of a product or category, and the locale section 508 may include second check boxes 518 for narrowing which language versions of the builds selected with the first check boxes 514 are searched.

In one example, the UI 500 will display all the respective categories (projects) and builds that can be searched in a repository. In another example, a user may have to specify a product or category and a keyword and select the search button 530 before the build and locale sections 506, 508 are populated for selection. Once all selections are made, a user can select the search button 530 to search the for the keyword 520 in screenshots of the selected builds. Once the search is completed, all of the builds that were not selected for a search with the first checkboxes 514, and all searched builds that do not include the keyword 520, may be removed from the build section 504. Remaining builds may be selected for display in the UI 500.

In another example, FIG. 5 may illustrate the dashboard 502 after a search has been performed. In this situation, the results under the build section 506 may indicate the builds that include at least one language version of a screenshot in the build that includes the keyword 520. The second checkboxes 514 may then be used to show which other languages the screenshot is available in as part of its respective build. In this situation, a checkmark in one of the first checkboxes 514 indicates the presence of a keyword match and availability for selection with respect to one or more builds. The first checkboxes 514 without checkmarks may be grayed out and unavailable for selection.

A checked build 540 in FIG. 5 has a category identifier 542 and name 544 that matches the reference ID for HTMLS-2 in Table 3 (see the node in Table 3 associated with Item No. 0 (<comment> node), and the value of the "value" item attribute for item0 in Table 4). Therefore, the "en_US" version of the checked build 540 corresponds to HTMLS-2. FIG. 6 illustrates an exemplary UI 600 for displaying selected results for a search such as the one illustrated in FIG. 5. More specifically, FIG. 6 illustrates exemplary search results for a search of DEF-2 of Table 4 for the keyword "User name" (part of search criterion illustrated in FIG. 5).

The UI 600 includes a build selection section 602 and a locale selection section 604 with checkboxes that can be selected by a user, and a keyword entry field 606 where a current keyword 616 can be displayed and subsequently modified by a user. A new search criterion selected or entered with these options can be applied to the DEFs of screenshots displayed, or listed for display, in a search results dashboard 620. The search result dashboard 620 may include a locale section 622, a screenshot ID section 624, and a display area 626 in which a language 632, category/name 634, and an image(s) of a marked-up screenshot(s) 636 resulting from an executed search. The marked-up screenshot 636 corresponds to webpage screenshot 400 of FIG. 4 and includes an identifying mark 640 around an area displaying a node 642. Node 642 is represented in Table 3 as the node having the Item No. designation of 3, and in Table 4 as item3 (which has a value of "User name" for a respective "value" item attribute).

FIG. 7 includes an exemplary illustration of a screenshot 700 that includes first and second nodes 702, 704 that both include the text "BLUE." In addition, FIG. 7 includes an illustration of UI 600 with the screenshot 700. The absolute coordinates of the second node 704 define the illustrated Region #2, which falls entirely within the absolute coordinates of the first node 702 which define illustrated Region #1. Applying the method of FIGS. 1-3 to the screenshot 700 may reveal an innerHTML for the first node 702 and a value of the second 704 include the text "BLUE." Depending on an extraction scheme applied, the markup service may determine the first node 702 (corresponding item in a DEF) is a duplicate match for the second node 704, and filter out the first node 702 in any search for this keyword. For example, the UI 600 in FIG. 7 illustrates a marked-up screenshot 736 for the screenshot 700 with an identifying mark 740 around an area including the keyword 742 and corresponding only to the second node 704.

FIG. 8 provides an illustration of exemplary system components for performing the methods of FIGS. 1-3. As shown in FIG. 8, a system 800 can include a user device 810, a system backend 820, and a repository 870.

The system 800 can be part of an enterprise system wherein a virtual machine (VM) is implemented on the user device 810 and managed by the system backend 820, or a management server (not shown) of the enterprise system. A VM can be a virtualization of a physical computing system or device. For example, the VM can be configured to simulate an embedded operating system that supports multiple applications. In one example, a VM is a virtualization of a user device such as a laptop, a mobile device, or other computing device. In another example, a VM can be a virtualization of a server or a data center.

The system backend 820 can be one or more physical servers. The system backend 820 can include a management server of an enterprise mobility management ("EMM") system, in one example. The system backend 820 can provide an administrator with tools to manage an infrastructure that includes VM implemented on user devices such as the user device 810. For example, either can run one or more VMWARE solutions, such as VSPHERE Client, VCENTER SERVER, and VREALIZE Suite.

According to an aspect of the present disclosure, the repository 870 can be a database that is hosted on one or more servers. In another example, the repository 870 can be a cloud-based storage component that is, like the other components of the system 800, part of an enterprise infrastructure that includes various computing devices and cloud-based services interconnected by local networks, wide-area networks, wireless communications, and the Internet.

In the system 800, the user device 810 (e.g., the VM implemented on the user device 810) provides a user interface 812 for searching screenshots, and defines a web content source 814 from which raw screenshots and HTML sources (web content 815) can be generated and sent to the system backend 820. In another example, the system backend 820 can implement the user interface 812 and obtain the web content 815. In either configuration, the system backend 820 can be one or more servers that execute a screenshot index service 830, a DOM extraction service 840, a content search service 850, and a screenshot markup service 860. Each of the services 830, 840, 850, 860 can be part of a software product that is at least partially provided by the backend. The software product can provide screenshot and HTML management tools, search and analysis tools, graphic illustration tools, and any other relevant features.

As illustrated in FIG. 8, the screenshot index service 830 can process the web content 815 and transmit categorized screenshots 831 to the repository 870, and transmit linked HTML sources 833 to the DOM extraction service 840. In turn, the DOM extraction service 840 can extract nodes from the linked HTML sources 833 and create DEFs 841, which it transmits to the repository 870. The content search service can search DEFs 841 in the repository 870 for keywords 817 received from the user device 810 through the user interface 812, and transmit keyword matches 851 to the screenshot markup service 860. The screenshot markup service 860 can filter our duplicate keyword matches. The screenshot markup service 860 can also identify and retrieve categorized screenshots 831 in the repository 870 that correspond to DEFs 841. The DEFs 841 can be specified by reference IDs of the keyword matches that remain after filtering. The screenshot markup service 860 can add identifying marks to the retrieved/identified screenshots (or copies of). The identifying marks may be added to the screenshots in locations where keywords appear. More specifically the identifying marks may be added in locations (areas) of nodes that: (a) correspond to items in the DEFs specified in the remaining keyword matches; and (b) include attributes with the searched-for keywords. In another example, the screenshot markup service can cause the repository to add the identifying marks. Finally, the screenshot markup service 860 can send marked-up screen shots 861 with identifying marks 863 to the user interface 812 for review by a user.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for searching for specific content in screenshots, the method comprising:
   - capturing a screenshot and an HTML Source for web content;
   - extracting Document Object Model (DOM) information from the HTML Source and creating a DOM extraction file (DEF);
   - storing the screenshot and the DEF in a repository;
   - receiving a keyword for a text search and searching the repository to find the keyword in a plurality of DEFs; and
   - identifying select screenshots in the repository that correspond to select DEFs that include the keyword.

2. The method of claim 1, further comprising:
   - adding identifying marks to the select screenshots in locations corresponding to items in the select DEFs including the keyword; and
   - displaying a list of the select screenshots including the identifying marks.

3. The method of claim 1, wherein capturing the screenshot and the HTML source comprises:
   - naming the screenshot;
   - assigning a category identifier to the screenshot; and linking the screenshot to the HTML source by adding a reference ID to the HTML source based on a screenshot name and the category identifier.

4. The method of claim 1, wherein extracting the DOM information comprises parsing through the HTML source and extracting nodes and associated attributes, and wherein creating the DEF comprises creating items and associated item attributes in the DEF that correspond to the extracted nodes and associated attributes in the HTML source.

5. The method of claim 4, wherein the nodes and associated attributes are extracted according to node and attribute types specified in an extraction scheme, and wherein the extraction scheme specifies a node type to be extracted based on a node corresponding to the node type being visible in screenshots.

6. The method of claim 4, wherein creating the DEF, for each extracted node, comprises:

creating a parent item attribute; and determining a value for the parent item attribute based on parent-child relationships between the extracted node and other nodes in a structure of a DOM that is used to generate the web content from the HTML source.

7. The method of claim 4, wherein creating the DEF, for each extracted node, comprises determining absolute coordinates of each extracted node and expressing the absolute coordinates as a value of a region item attribute for the item, and wherein the absolute coordinates define a location and area occupied by the extracted node within a respective screenshot.

8. The method of claim 1, further comprising:

determining a positional relationship between, first absolute coordinates of a first node corresponding to a first item in the DEF having a first keyword match for a keyword, and second absolute coordinates of a second node corresponding to a second item having as second keyword match for the keyword; and filtering out one of the first keyword match and the second keyword match as a duplicate match based on the positional relationship and at least one of, a parent child relationship between the first node and the second node, and a respective item attribute of the first item and the second item that includes the keyword.

9. A non-transitory, computer-readable medium comprising instructions that, when executed by a processor, perform stages for searching for specific content in screenshots, the stages comprising:

capturing a screenshot and an HTML Source for web content;

extracting Document Object Model (DOM) information from the HTML Source and creating a DOM extraction file (DEF);

storing the screenshot and the DEF in a repository;

receiving a keyword for a text search and searching the repository to find the keyword in a plurality of DEFs; and identifying select screenshots in the repository that correspond to select DEFs that include the keyword.

10. The non-transitory, computer-readable medium of claim 9, the stages further comprising:

adding identifying marks to the select screenshots in locations corresponding to items in the select DEFs including the keyword; and displaying a list of the select screenshots including the identifying marks.

11. The non-transitory, computer-readable medium of claim 9, wherein capturing the screenshot and the HTML source comprises the stages of:

naming the screenshot;

assigning a category identifier to the screenshot; and linking the screenshot to the HTML source by adding a reference ID to the HTML source based on a screenshot name and the category identifier.

12. The non-transitory, computer-readable medium of claim 9, wherein extracting the DOM information comprises parsing through the HTML source and extracting nodes and associated attributes, and wherein creating the DEF comprises creating items and associated item attributes in the DEF that correspond to the extracted nodes and associated attributes in the HTML source.

13. The non-transitory, computer-readable medium of claim 12, wherein the nodes and associated attributes are extracted according to node and attribute types specified in an extraction scheme, and wherein the extraction scheme specifies a node type to be extracted based on a node corresponding to the node type being visible in screenshots.

14. The non-transitory, computer-readable medium of claim 12, wherein creating the DEF, for each extracted node, comprises the stages of:

creating a parent item attribute;

determining a value for the parent item attribute based on parent-child relationships between the extracted node and other nodes in a structure of a DOM that is used to generate the web content from the HTML source; and determining absolute coordinates of each extracted node and expressing the absolute coordinates as a value of a region item attribute for the item, wherein the absolute coordinates define a location and area occupied by the extracted node within a respective screenshot.

15. A system for searching for specific content in screenshots, comprising:

a memory storage including a non-transitory, computer-readable medium comprising instructions; and a backend including a processor that executes the instructions to carry out stages comprising:

capturing a screenshot and an HTML Source for web content;

extracting Document Object Model (DOM) information from the HTML Source and creating a DOM extraction file (DEF);

storing the screenshot and the DEF in a repository;

receiving a keyword for a text search and searching the repository to find the keyword in a plurality of DEFs; and identifying select screenshots in the repository that correspond to select DEFs that include the keyword.

16. The system of claim 15, the stages further comprising:

adding identifying marks to the select screenshots in locations corresponding to items in the select DEFs including the keyword; and displaying a list of the select screenshots including the identifying marks.

17. The system of claim 15, wherein extracting the DOM information comprises parsing through the HTML source and extracting nodes and associated attributes, and wherein creating the DEF comprises creating items and associated item attributes in the DEF that correspond to the extracted nodes and associated attributes in the HTML source.

18. The system of claim 17, wherein the nodes and associated attributes are extracted according to node and attribute types specified in an extraction scheme, and wherein the extraction scheme specifies a node type to be extracted based on a node corresponding to the node type being visible in screenshots.

19. The system of claim 17, wherein creating the DEF, for each extracted node, comprises the stages of:

creating a parent item attribute;

determining a value for the parent item attribute based on parent-child relationships between the extracted node and other nodes in a structure of a DOM that is used to generate the web content from the HTML source; and determining absolute coordinates of each extracted node and expressing the absolute coordinates as a value of a region item attribute for the item, wherein the absolute coordinates define a location and area occupied by the extracted node within a respective screenshot.

20. The system of claim 15, the stages further comprising:

determining a positional relationship between, first absolute coordinates of a first node corresponding to a first item in the DEF having a first keyword match for a keyword, and second absolute coordinates of a second node corresponding to a second item having as second keyword match for the keyword; and filtering out one of the first keyword match and the second keyword match as a duplicate match based on the positional relationship and at least one of, a parent child relationship between the first node and the second node, and a respective item attribute of the first item and the second item that includes the keyword.

* * * * *